United States Patent Office 3,023,142
Patented Feb. 27, 1962

3,023,142
TRITHIOCARBONATES AS BIRD REPELLENTS
Lyle D. Goodhue and Rector P. Louthan, Bartlesville, and Kenneth E. Cantrel, Dewey, Okla., assignors to Phillips Petroleum Company, a corporation of Delaware
No Drawing. Filed May 2, 1960, Ser. No. 25,894
20 Claims. (Cl. 167—46)

This invention relates to a method of repelling birds. In one of its aspects, the invention relates to a method for rendering a locus repellent to birds. In another of its aspects, the invention relates to a method for rendering a surface repellent to birds. In still another of its aspects, the invention relates to a method for treating seeds, grain, and the like so as to render the same repellent birds that normally feed thereon. A further aspect of the invention relates to a method for treating buildings to render the same repellent to birds.

A number of repellents for certain pests, such as insects and rodents have been developed and are known in the art. However very little success has been attained in the search for a material which is repellent to birds. It is very desirable to be able to repel birds from certain areas and surfaces. For instance, the loss of grain at the present time to feeding birds represents a large financial loss to the farmers of this country each year. Also, as is well known, many birds through their roosting habits foul buildings, sidewalks, and the like.

It is an object of this invention to provide new bird repellent compositions. It is a further object of this invention to provide a method for repelling birds. Still another object is to provide a method for rendering surfaces repellent to birds.

Other aspects, objects, and the several advantages of the invention are apparent from a study of the disclosure and the appended claims.

According to the present invention, we have discovered that birds can be repelled from surfaces frequented by them by applying to said surfaces an amount of at least one of the compounds of the formula

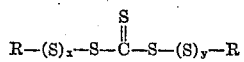

wherein R is an alkyl radical containing from 1–16 carbon atoms, inclusive, $x$ is selected from the group consisting of 1 and 2, and $y$ is selected from the group consisting of 0, 1, and 2.

Specific examples of compounds falling within the scope of the above formula are S-n-butylthiosulfenyl S'-n-butyl trithiocarbonate
S-methylsulfenyl-S'-n-propylthiosulfenyl trithiocarbonate
S,S'-di-n-hexylsulfenyl trithiocarbonate
S-n-octylthiosulfenyl S'-n-decyl trithiocarbonate
S-n-dodecylsulfenyl S'-ethylthiosulfenyl trithiocarbonate
S-n-butylthiosulfenyl S'-n-butylsulfenyl trithiocarbonate
S,S'-di-n-hexadecylthiosulfenyl trithiocarbonate
S-n-butylsulfenyl S'-n-hexyl trithiocarbonate
S-methylsulfenyl S'-methyl trithiocarbonate
S,S'-dimethylthiosulfenyl trithiocarbonate
S-tert-butylsulfenyl S'-tert-butyl trithiocarbonate
S-isopropylsulfenyl S'-n-decyl trithiocarbonate
S-tert-octylthiosulfenyl S'-ethylsulfenyl trithiocarbonate
S,S'-di-tert-hexadecylsulfenyl trithiocarbonate and the like.

The bird repellents of this invention can be applied for their intended purpose as the pure compound, or in combination with a carrier or inert materials such as solutions or emulsions. Solvents or carriers can be used which are substantially inert with respect to the active bird repellent. Examples of carrier materials which can be employed are Acetone
Deodorized kerosene
Naphthas
Isoparaffinic hydrocarbon fractions boiling in the approximate range of 260–800° F. (Soltrol)

and the like. If desired, the bird repellents of this invention can be applied as aqueous emulsions, in which case a suitable emulsifying or wetting agent is employed. The repellent materials can also be applied as dusts, using such solid carriers as kieselguhr and the like. In addition, the materials for repelling birds can be applied to surfaces from which it is desired to repel these animals in conjunction with an adhesive.

The bird repellents of this invention can be applied in the above-described forms by spraying, brushing, dusting, etc. The preferred method of application is by spraying a liquid composition on the surface to be treated. When applying the repellents of this invention in a solvent or carrier, the liquid compositions will normally contain from 0.1 to 10 weight percent of one of the above-described trithiocarbonates, although concentrations above and below this range can be used. When these materials are applied in the form of dusts, the concentration of active ingredient is preferably within the range between 1 and 20 weight percent, although concentrations above and below this range are applicable.

The bird repellents of this invention are applied to surfaces in a manner so as to deposit an amount within the range between 1 and 10 grams of the active repellent material per each 100 square feet of surface from which the birds are to be repelled. Larger or smaller amounts can be applied, if desired, although larger amounts are generally uneconomical.

When the bird repellents of this invention are applied to feed, grain, or the like, application is normally made so as to deposit between 0.05 and 5 weight percent, based on the feed, of the active repellent although amounts above and below this range can be used. A more preferred range is from 0.1 to 2 weight percent. Examples of grain and feed which are normally consumed by birds and which can be treated according to this invention are Rice
Wheat
Barley
Sorghum grain
Fruit and plant seeds of flowers, vegetables, and the like. In addition, these bird repellents can be applied to window ledges, roofs, beams, and the like.

The bird repellents of this invention can be prepared, for example, by the reaction of dimetallic trithiocarbonates with n-alkylsulfenyl halides and/or n-alkylthiosulfenyl halides, as well as any other method known in the art.

The following specific examples illustrate the effectiveness of the bird repellents of this invention but are not intended to limit the scope of the invention.

*Example 1*

A bird repellent formulation is made up in the following manner. Twenty-five parts by weight of S-n-butylsulfenyl S'-n-hexyl trithiocarbonate and ten parts by weight of the sodium salt of dodecylbenzene sulfonic acid are dissolved in 65 parts by weight of xylene, and the resulting solution is emulsified with 1,150 parts by weight of water. The resulting emulsion is then sprayed onto the heads of sorghum grain at the rate of 2.5 pounds per acre. The spacing of the sorghum plants and the rate of application are such that the head of the sorghum grain contain 0.07 weight percent of the active bird repellent. Consumption of the sorghum grain by birds is substantially eliminated for a three-week period, and essentially no desiccation of the plant results from treatment with this formulation.

*Example II*

In this example, pans of treated and untreated grain were exposed to birds on the roof of a building in a municipal area heavily frequented by sparrows, pigeons, and other varieties of birds.

In this run, 340 grams (500 ml.) of grain sorghum were treated with 3.4 grams of S-n-butylthiosulfenyl S'-n-butyl trithiocarbonate dissolved in 20 cc. of acetone. The resulting mixture was then dried under a hood to evaporate the acetone, and the resulting dried feed was exposed to birds in the above-described area. A pan containing the same amount of untreated grain was placed in the same location. Daily observations were made on the amounts of treated and untreated grain which had been consumed by the birds. Since the untreated grain was eaten very rapidly, it was necessary to replenish the untreated grain a number of times. The effectiveness of the repellent was calculated by the formula $$\text{Percent repellency} = 100 - \frac{\text{amount of treated grain consumed during 10 day period}}{\text{amount of untreated grain consumed during 10 day period}} \times 100$$

By this method, S-n-butylthiosulfenyl S'-n-butyl trithiocarbonate was 99.3 percent repellent.

*Example III*

A run was also carried out in which grain growing in the field was sprayed with a solution of one of the bird repellents of this invention.

In this run, a five percent by weight solution of S-n-butylthiosulfenyl S'-n-butyl trithiocarbonate in mineral oil (base oil No. 1) was applied to grain sorghum by spraying the material onto the heads of the grain. Three liters of this solution were applied on approximately 200 feet of row. Very little feeding by birds was experienced during a 37-day period beginning at the time the grain was sprayed. In comparison, the grain in control rows adjacent to the sprayed grain was practically all eaten.

*Example IV*

Another run was carried out according to the method of Example II, in which pans of treated and untreated grain were exposed to birds in a municipal area heavily frequented by several species of birds.

In this run, 340 grams (500 ml.) of grain sorghum were treated with 1.7 grams of S-tert-butylsulfenyl S'-tert-butyl trithiocarbonate dissolved in 20 cc. of acetone. The resulting mixture was then dried under a hood to evaporate the acetone, and the resulting dried feed was exposed to birds in the above described area. A like amount of untreated grain was placed in the same location. Daily observations were made on the amounts of treated and untreated grain which had been consumed by the birds, and since the untreated grain was eaten very rapidly, it was necessary to replenish the untreated grain a number of times. During a five day period, a total of 221 grams (325 ml.) of the treated grain was consumed by the birds. During the same period, a total of 1700 grams (2,500 ml.) of the untreated grain was consumed. The calculated percent repellency, using the formula disclosed in Example II, was 87 percent.

Reasonable variation and modification are possible within the scope of the foregoing disclosure and the appended claims to the invention, the essence of which is that it has been found that trithiocarbonates of the structural formula described are repellent to birds.

We claim:

1. A method for repelling birds which comprises subjecting a non-defoliatable plant from which the birds are to be repelled to the action of at least one compound of the formula:

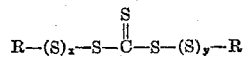

wherein R is an alkyl radical containing from 1–16 carbon atoms inclusive, $x$ is selected from the group consisting of 1 and 2, and $y$ is selected from the group consisting of 0, 1, and 2.

2. A method according to claim 1 wherein said compound is S-n-butylthiosulfenyl S'-n-butyl trithiocarbonate.

3. A method according to claim 1 wherein said compound is S-methylsulfenyl S'-n-propylthiosulfenyl trithiocarbonate.

4. A method according to claim 1 wherein said compound is S,S'-di-n-hexylsulfenyl trithiocarbonate.

5. A method according to claim 1 wherein said compound is S-n-octylthiosulfenyl S'-n-decyl trithiocarbonate.

6. A method according to claim 1 wherein said compound is S-n-dodecylsulfenyl S'-ethylthiosulfenyl trithiocarbonate.

7. A method according to claim 1 wherein said compound is S-n-butylthiosulfenyl S'-n-butylsulfenyl trithiocarbonate.

8. A method according to claim 1 wherein said compound is S,S'-di-n-hexadecylthiosulfenyl trithiocarbonate.

9. A method according to claim 1 wherein said compound is S-n-butylsulfenyl S'-n-hexyl trithiocarbonate.

10. A method according to claim 1 wherein said compound is S-tert-butylsulfenyl S'-tert-butyl trithiocarbonate.

11. A method according to claim 1 wherein said compound is dispersed in a carrier adjuvant selected from the group consisting of acetone, deodorized kerosene, naphthas, isoparaffinic hydrocarbon fractions boiling in the approximate range of 260–800° F. and a solid.

12. A method according to claim 1 wherein at least one of the alkyl radicals is a normal alkyl radical.

13. A method according to claim 1 wherein at least one of the alkyl radicals is a tertiary alkyl radical.

14. A method for repelling birds which comprises subjecting a bird to the action of at least one compound of the formula

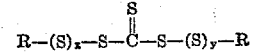

wherein R is an alkyl radical containing from 1–16 carbon atoms inclusive, $x$ is selected from the group consisting of 1 and 2, and $y$ is selected from the group consisting of 0, 1, and 2.

15. A method for repelling birds from seed in the field which comprises treating said seed before distributing it in said field with at least one compound of the formula

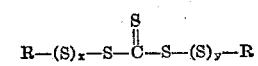

wherein R is an alkyl radical containing from 1–16 carbon atoms inclusive, $x$ is selected from the group consisting of 1 and 2, and $y$ is selected from the group consisting of 0, 1, and 2, then distributing said seed in said field.

16. A seed protected against ravaging or eating by birds, said seed having been impregnated with at least one compound of the formula

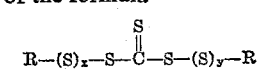

wherein R is an alkyl radical containing from 1–16 carbon atoms, inclusive, $x$ is selected from the group consisting of 1 and 2, and $y$ is selected from the group consisting of 0, 1, and 2.

17. A method for repelling birds which comprises subjecting at least a portion of a building from which the birds are to be repelled to the action of at least one compound of the formula

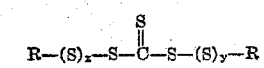

wherein R is an alkyl radical containing from 1–16 carbon atoms inclusive, $x$ is selected from the group consisting of 1 and 2, and $y$ is selected from the group consisting of 0, 1, and 2.

18. A method according to claim 17 wherein said compound is dispersed in a carrier adjuvant selected from the group consisting of acetone, deodorized kerosene, napthas, isoparaffinic hydrocarbon fractions boiling in the approximate range of 260–800° F. and a solid, and the thus-formed composition is applied to a surface of said building so as to deposit an amount within the range between about 1 and about 10 grams of the active repellent material per each 100 square feet of said surface.

19. A method according to claim 17 wherein said compound is S-n-butylthiosulfenyl S'-n-butyl trithiocarbonate.

20. A method according to claim 17 wherein said compound is S-n-butylsulfenyl S'-n-hexyl trithiocarbonate.

References Cited in the file of this patent

UNITED STATES PATENTS 2,607,673  Goodhue et al. ---------- Aug. 19, 1952